US011114048B1

(12) United States Patent
Huang

(10) Patent No.: US 11,114,048 B1
(45) Date of Patent: Sep. 7, 2021

(54) DRIVING CIRCUIT ADAPTABLE TO AN ELECTROPHORETIC DISPLAY

(71) Applicant: Himax Technologies Limited, Tainan (TW)

(72) Inventor: Han Wen Huang, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 17/116,267

(22) Filed: Dec. 9, 2020

(51) Int. Cl.
*G06F 1/00* (2006.01)
*G09G 3/34* (2006.01)

(52) U.S. Cl.
CPC ....... *G09G 3/344* (2013.01); *G09G 2330/028* (2013.01)

(58) Field of Classification Search
None
See application file for complete search history.

(56) References Cited

U.S. PATENT DOCUMENTS

2015/0168799 A1* 6/2015 Emori .................... G01M 11/30
324/750.01

* cited by examiner

*Primary Examiner* — Michael A Faragalla
(74) *Attorney, Agent, or Firm* — Donald E. Stout; Stout, Uxa & Buyan, LLP

(57) ABSTRACT

A driving circuit adaptable to an electrophoretic display includes a first transistor and a second transistor electrically connected in series between a first positive voltage node and a first negative voltage node, the first transistor and the second transistor being interconnected at an output node; a third transistor electrically connected between the output node and a ground; a first voltage regulator that switchably provides one of a plurality of positive supply voltages to the first positive voltage node; a second voltage regulator that provides a negative supply voltage to the first negative voltage node; a switching circuit having a plurality of outputs electrically connected to the first transistor, the second transistor and the third transistor to turn on or off the first transistor, the second transistor and the third transistor respectively; and a controller that controls the first voltage regulator, the second voltage regulator and the switching circuit.

20 Claims, 4 Drawing Sheets

DRIVING CIRCUIT ADAPTABLE TO AN ELECTROPHORETIC DISPLAY

BACKGROUND OF THE INVENTION

1. Field of the Invention

The present invention generally relates to an electrophoretic display, and more particularly to a driving circuit adaptable to the electrophoretic display.

2. Description of Related Art

An electrophoretic display, also called electronic paper or ink, is a display device that contains charged electrophoretic particles to imitate the appearance of ordinary ink or paper. The electrophoretic display reflects light instead of emitting light as in a conventional flat panel display such as liquid crystal display.

The electrophoretic displays may include black-and-white displays and color displays. The color displays, however, ordinarily suffer reduced sharpness caused by blurred image edges. Such issues may be improved by adjusting the terminal voltage and time of the driving signal to adjust the positions of the internal charged electrophoretic particles.

The pixels of the electrophoretic display are commonly driven by a driving circuit made of low-dropout (LDO) regulators and output metal-oxide-semiconductor (MOS) transistors, which however occupy a substantial circuit area. A need has arisen to propose a novel scheme to simplify the circuit structure and reduce circuit area of the driving circuit adaptable to the electrophoretic display.

SUMMARY OF THE INVENTION

In view of the foregoing, it is an object of the embodiment of the present invention to provide a driving circuit adaptable to an electrophoretic display with simplified circuit structure, reduced cost and power consumption without sacrificing performance.

According to one embodiment, a driving circuit adaptable to an electrophoretic display includes a first transistor, a second transistor, a third transistor, a first voltage regulator, a second voltage regulator, a switching circuit and a controller. The first transistor and the second transistor are electrically connected in series between a first positive voltage node and a first negative voltage node, and the first transistor and the second transistor are interconnected at an output node. The third transistor is electrically connected between the output node and a ground. The first voltage regulator switchably provides one of a plurality of positive supply voltages to the first positive voltage node, and the second voltage regulator provides a negative supply voltage to the first negative voltage node. The switching circuit has a plurality of outputs electrically connected to the first transistor, the second transistor and the third transistor to turn on or off the first transistor, the second transistor and the third transistor respectively. The controller controls the first voltage regulator, the second voltage regulator and the switching circuit.

DETAILED DESCRIPTION OF THE INVENTION

Figure 1:
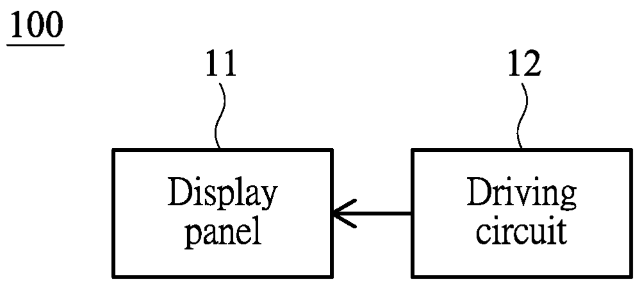
FIG. 1 shows a block diagram illustrating an electrophoretic display according to one embodiment of the present invention.
Figure 2:
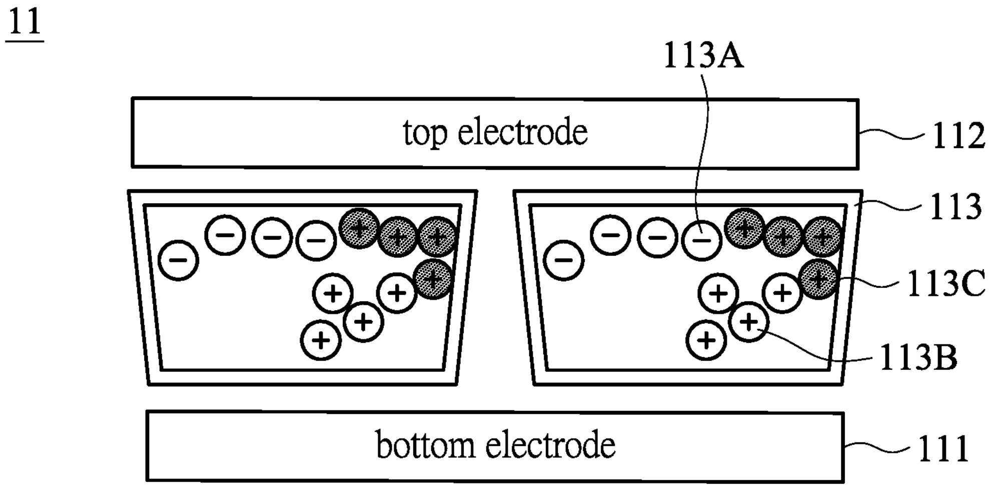
FIG. 2 shows a cross sectional view of the display panel of FIG. 1.

FIG. 1 shows a block diagram illustrating an electrophoretic display 100 according to one embodiment of the present invention. The electrophoretic display 100 of the embodiment may include a display panel 11 including a plurality of pixels arranged in an array. FIG. 2 shows a cross sectional view of the display panel 11 of FIG. 1.

Specifically, the display panel 11 may include a bottom electrode 111, a (transparent) top electrode 112 and electrophoretic units (or microcups) 113 disposed between the bottom electrode 111 and the top electrode 112. In the example as shown in FIG. 2, the electrophoretic unit 113 may include white electrophoretic particles 113A being negatively charged, black electrophoretic particles 113B being positive charged, and color electrophoretic particles 113C being positive charged but less charged than the black electrophoretic particles 113B. When a drive voltage is applied to the bottom electrode 111 with respect to the top electrode 112, electrophoretic particles of a specific type may migrate electrophoretically toward the top electrode 112, that is, the viewing side of the display panel 11. For example, when a (large) positive drive voltage (e.g., +15 volts) is applied to the bottom electrode 111, the black electrophoretic particles 113B may migrate toward the top electrode 112 to display black. When a medium positive drive voltage (e.g., +5 volts) is applied to the bottom electrode 111, the color electrophoretic particles 113C may migrate toward the top electrode 112 to display color (e.g., red). When a negative drive voltage (e.g., −15 volts) is applied to the bottom electrode 111, the white electrophoretic particles 113A may migrate toward the top electrode 112 to display white. Details of the methods of driving the display panel 11 may be referred to U.S. Pat. No. 10,591,800 entitled "Electrophoretic display and driving method thereof," which is incorporated herein by reference.

Figure 3:
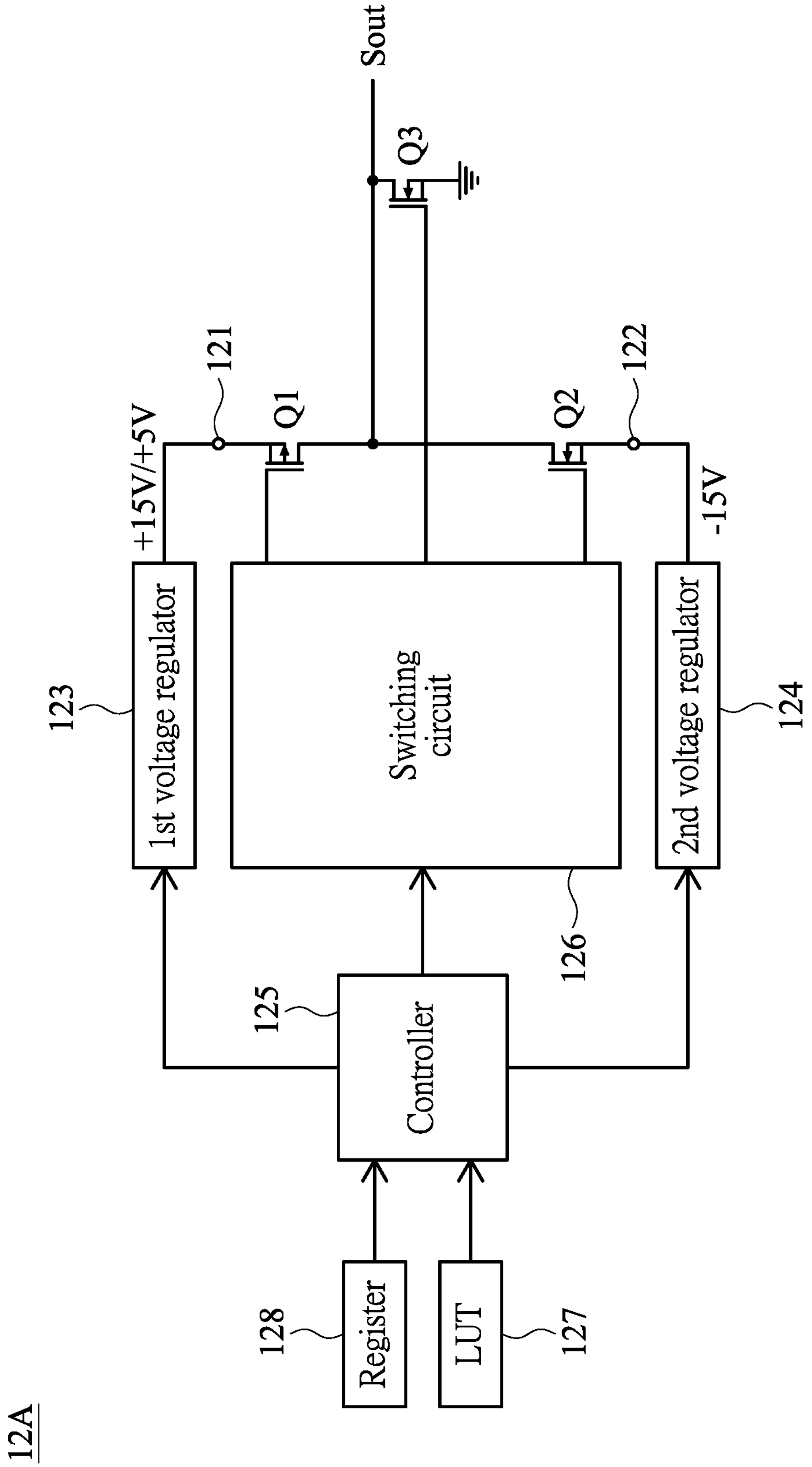
FIG. 3 shows a circuit diagram illustrating a driving circuit adaptable to the electrophoretic display of FIG. 1 according to one embodiment of the present invention.

The electrophoretic display 100 of the embodiment may include a driving circuit 12 configured to drive the display panel 11 of FIG. 1. FIG. 3 shows a circuit diagram illustrating a driving circuit 12A adaptable to the electrophoretic display 100 of FIG. 1 according to one embodiment of the present invention.

The driving circuit 12A of the embodiment may include a first transistor Q1 of a first type and a second transistor Q2 of a second type (that is opposite to the first type) electrically connected in series between a (first) positive voltage node 121 and a (first) negative voltage node 122. The first transistor Q1 and the second transistor Q2 are interconnected at an output node Sout. In the embodiment, the first transistor Q1 and the second transistor Q2 may be metal-oxide-semiconductor (MOS) transistors, and the first type and the second type are P type and N type respectively.

Specifically, a source of the first transistor Q1 is electrically connected to the positive voltage node 121, a drain of the first transistor Q1 is electrically connected to a drain of the second transistor Q2 at the output node Sout, and a source of the second transistor Q2 is electrically connected to the negative voltage node 122.

The driving circuit 12A of the embodiment may include a third transistor Q3 of the second type electrically connected between the output node Sout and a ground. Specifically, a drain of the third transistor Q3 is electrically connected to the output node Sout, and a source of the third transistor Q3 is electrically connected to the ground.

According to one aspect of the embodiment, the driving circuit 12A may include a first voltage regulator 123 configured to switchably provide one of a plurality of (different) positive supply voltages (e.g., +15 volts and +5 volts) to the positive voltage node 121. That is, the first voltage regulator 123 may include a multi-voltage regulator. The driving circuit 12A of the embodiment may include a second voltage regulator 124 configured to provide a negative supply voltage (e.g., −15 volts) to the negative voltage node 122. In the embodiment, the first voltage regulator 123 and the second voltage regulator 124 may include low-dropout (LDO) regulators.

The driving circuit 12A of the embodiment may include a (timing) controller 25 that is configured to control a switching circuit 126 having a plurality of outputs respectively connected electrically to gates of the first transistor Q1, the second transistor Q2 and the third transistor Q3 to respectively turn on or off the first transistor Q1, the second transistor Q2 and the third transistor Q3. Specifically, a positive drive voltage may be generated at the output node Sout through the turned-on first transistor Q1 (while turning off the second transistor Q2 and the third transistor Q3), a negative drive voltage may be generated at the output node Sout through the turned-on second transistor Q2 (while turning off the first transistor Q1 and the third transistor Q3), and a zero drive voltage may be generated at the output node Sout through the turned-on third transistor Q3 (while turning off the first transistor Q1 and the second transistor Q2). In other words, in the embodiment, only one transistor may be turned on at a time. In one embodiment, the switching circuit 126 may include a (binary) decoder such as 2-to-4 decoder, three output bits of which are respectively connected electrically to the gates of the first transistor Q1, the second transistor Q2 and the third transistor Q3.

In the embodiment, the driving circuit 12A may include a lookup table (LUT) 127 that stores a sequence of control codes provided to the controller 125 for consecutively controlling the switching circuit 126. The driving circuit 12A of the embodiment may include a register 128 that stores numbers representing supply voltages to be read by the controller 125 to correspondingly control the first voltage regulator 123 and the second voltage regulator 124.

According to the driving circuit 12A as described above, a drive voltage of +15 volts, +5 volts or −15 volts may be generated at the output node Sout. As multiple positive supply voltages may be provided by the single multi-voltage regulator (i.e., the first voltage regulator 123), fewer MOS transistors and LDO regulators are required as compared to the conventional driving circuit.

Figure 4A:
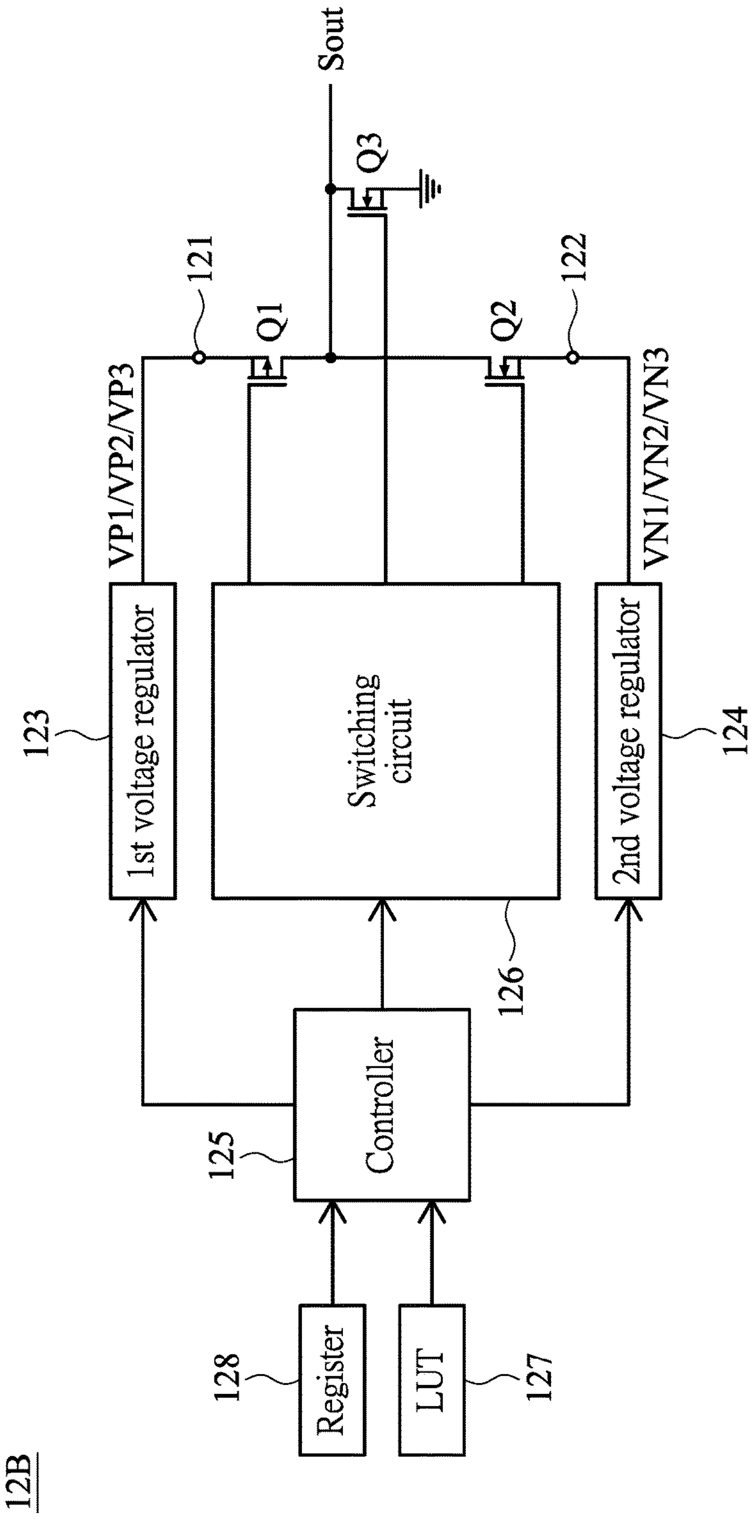
FIG. 4A shows a circuit diagram illustrating a driving circuit adaptable to the electrophoretic display of FIG. 1 according to another embodiment of the present invention.
Figure 4B:
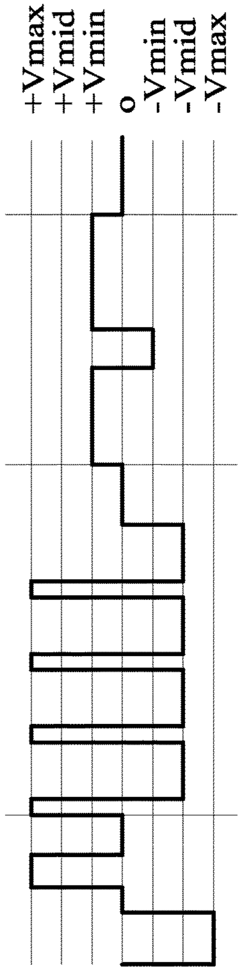
FIG. 4B shows an exemplary waveform illustrating the drive voltage at the output node.

FIG. 4A shows a circuit diagram illustrating a driving circuit 12B adaptable to the electrophoretic display 100 of FIG. 1 according to another embodiment of the present invention. FIG. 4B shows an exemplary waveform illustrating the drive voltage at the output node Sout. The driving circuit 12B of FIG. 4A is similar to the driving circuit 12A of FIG. 3 with the exceptions as described below.

In the embodiment, the first voltage regulator 123 may include a multi-voltage regulator capable of switchably providing one of a plurality of (different) positive supply voltages VP1, VP2 and VP3, and the second voltage regulator 124 may include a multi-voltage regulator capable of switchably providing one of a plurality of (different) negative supply voltages VN1, VN2 and VN3. Accordingly, as exemplified in FIG. 4B, there are seven possible drive voltages (e.g., −Vmax, −Vmid, −Vmin, 0, +Vmin, +Vmid and +Vmax) at the output node Sout.

Figure 5:
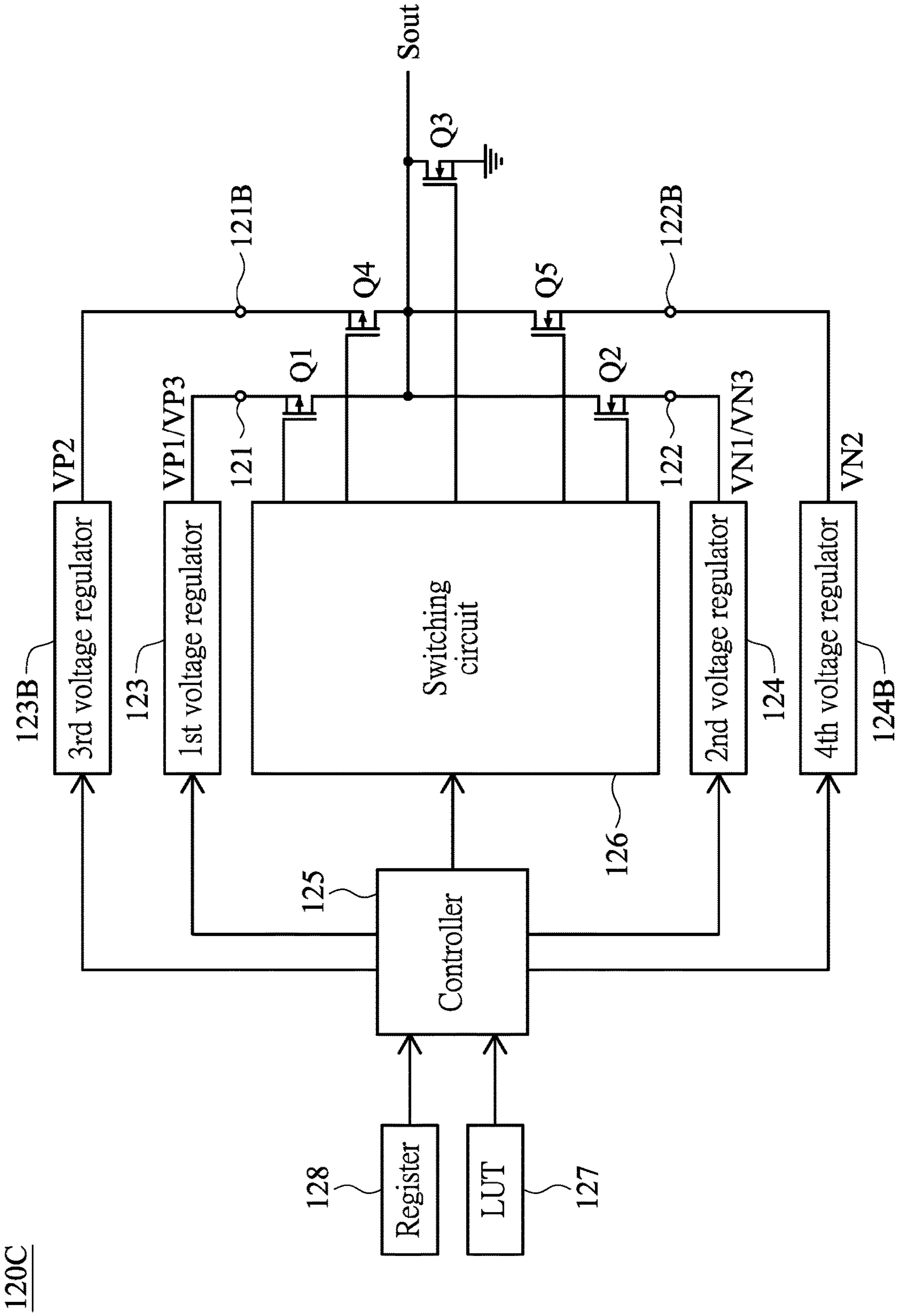
FIG. 5 shows a circuit diagram illustrating a driving circuit adaptable to the electrophoretic display of FIG. 1 according to a further embodiment of the present invention.

FIG. 5 shows a circuit diagram illustrating a driving circuit 12C adaptable to the electrophoretic display 100 of FIG. 1 according to a further embodiment of the present invention. The driving circuit 12C is capable of generating multiple (e.g., five) possible drive voltages.

In the embodiment, in addition to the first transistor Q1, the second transistor Q2 and the third transistor Q3, the driving circuit 12C may include a fourth transistor Q4 of the first type and a fifth transistor Q5 of the second type electrically connected in series between a second positive voltage node 121B and a second negative voltage node 122B with a configuration similar to the first transistor Q1 and the second transistor Q2. In addition to the first voltage regulator 123 (configured to provide a positive supply voltage VP1 or VP3 to the first positive voltage node 121) and the second voltage regulator 124 (configured to provide a negative supply voltage VN1 or VN3 to the first negative voltage node 122), the driving circuit 12C may include a third voltage regulator 123B (configured to provide a positive supply voltage VP2 to the second positive voltage node 121B) and a fourth voltage regulator 129 (configured to provide a negative supply voltage VN2 to the second negative voltage node 122B).

According to one aspect of the embodiment, while the first voltage regulator 123 provides one (e.g., VP1) of the positive supply voltages to the first positive voltage node 121 (with turned-on first transistor Q1) for generating a current (positive) drive voltage at the output node Sout, the third voltage regulator 123B provides another (e.g., VP2) of the positive supply voltages to the second positive voltage node 121B (with turned-off fourth transistor Q4) to prepare for generating a next drive voltage at the output node Sout. Therefore, the next drive voltage may then be generated at the output node Sout without delay.

Similarly, while the second voltage regulator 124 provides one (e.g., VN1) of the negative supply voltages to the first negative voltage node 122 (with turned-on second transistor Q2) for generating a current (negative) drive voltage at the output node Sout, the fourth voltage regulator 124B provides another (e.g., VN2) of the negative supply voltages to the second negative voltage node 122B (with turned-off fifth transistor Q5) to prepare for generating a next drive voltage at the output node Sout. Therefore, the next drive voltage may then be generated at the output node Sout without delay.

Although specific embodiments have been illustrated and described, it will be appreciated by those skilled in the art that various modifications may be made without departing from the scope of the present invention, which is intended to be limited solely by the appended claims.

What is claimed is:

1. A driving circuit adaptable to an electrophoretic display, comprising:

a first transistor and a second transistor electrically connected in series between a first positive voltage node and a first negative voltage node, the first transistor and the second transistor being interconnected at an output node;

a third transistor electrically connected between the output node and a ground;

a first voltage regulator that switchably provides one of a plurality of positive supply voltages to the first positive voltage node;

a second voltage regulator that provides a negative supply voltage to the first negative voltage node;

a switching circuit having a plurality of outputs electrically connected to the first transistor, the second transistor and the third transistor to turn on or off the first transistor, the second transistor and the third transistor respectively; and a controller that controls the first voltage regulator, the second voltage regulator and the switching circuit.

2. The driving circuit of claim 1, wherein the first transistor has a first type, the second transistor has a second type being opposite to the first type, and the third transistor has the second type.

3. The driving circuit of claim 2, wherein a source of the first transistor is electrically connected to the first positive voltage node, a drain of the first transistor is electrically connected to a drain of the second transistor at the output node, a source of the second transistor is electrically connected to the first negative voltage node, a drain of the third transistor is electrically connected to the output node, and a source of the third transistor is electrically connected to the ground.

4. The driving circuit of claim 3, wherein the outputs of the switching circuit are respectively connected electrically to gates of the first transistor, the second transistor and the third transistor.

5. The driving circuit of claim 1, wherein the first transistor, the second transistor and the third transistor comprise metal-oxide-semiconductor transistors.

6. The driving circuit of claim 1, wherein the first voltage regulator and the second voltage regulator comprise low-dropout regulators.

7. The driving circuit of claim 1, wherein only one of the first transistor, the second transistor and the third transistor is turned on at a time by the switching circuit.

8. The driving circuit of claim 1, wherein the switching circuit comprises a binary decoder.

9. The driving circuit of claim 1, further comprising:

a lookup table that stores a sequence of control codes provided to the controller for consecutively controlling the switching circuit.

10. The driving circuit of claim 1, further comprising:

a register that stores numbers representing supply voltages to be read by the controller to correspondingly control the first voltage regulator and the second voltage regulator.

11. The driving circuit of claim 1, wherein the second voltage regulator switchably provides one of a plurality of negative supply voltages to the first negative voltage node.

12. The driving circuit of claim 11, further comprising:

a fourth transistor and a fifth transistor electrically connected in series between a second positive voltage node and a second negative voltage node, the fourth transistor and the fifth transistor being interconnected at the output node;

a third voltage regulator that switchably provides one of the plurality of positive supply voltages to the second positive voltage node; and a fourth voltage regulator that provides one of the plurality of negative supply voltages to the second negative voltage node.

13. The driving circuit of claim 12, wherein while the first voltage regulator provides one of the positive supply voltages to the first positive voltage node for generating a current drive voltage at the output node, the third voltage regulator provides another of the positive supply voltages to the second positive voltage node to prepare for generating a next drive voltage at the output node.

14. The driving circuit of claim 12, wherein while the second voltage regulator provides one of the negative supply voltages to the first negative voltage node for generating a current drive voltage at the output node, the fourth voltage regulator provides another of the negative supply voltages to the second negative voltage node to prepare for generating a next drive voltage at the output node.

15. The driving circuit of claim 12, wherein the fourth transistor has the first type and the fifth transistor has the second type.

16. The driving circuit of claim 15, wherein a source of the fourth transistor is electrically connected to the second positive voltage node, a drain of the fourth transistor is electrically connected to a drain of the fifth transistor at the output node, and a source of the fifth transistor is electrically connected to the second negative voltage node.

17. The driving circuit of claim 16, wherein the outputs of the switching circuit are respectively connected electrically to gates of the fourth transistor and the fifth transistor.

18. The driving circuit of claim 12, wherein the fourth transistor and the fifth transistor comprise metal-oxide-semiconductor transistors.

19. The driving circuit of claim 12, wherein the third voltage regulator and the fourth voltage regulator comprise low-dropout regulators.

20. The driving circuit of claim 12, wherein only one of the first transistor, the second transistor, the third transistor, the fourth transistor and the fifth transistor is turned on at a time by the switching circuit.

* * * * *